(12) United States Patent
Krishnan et al.

(10) Patent No.: US 11,703,570 B2
(45) Date of Patent: Jul. 18, 2023

(54) SENSOR ASSEMBLY FOR AUTONOMOUS VEHICLE

(71) Applicant: Ford Global Technologies, LLC, Dearborn, MI (US)

(72) Inventors: Venkatesh Krishnan, Canton, MI (US); Sunil Reddy Patil, Troy, MI (US); Raghu Raman Surineedi, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 874 days.

(21) Appl. No.: 16/558,714

(22) Filed: Sep. 3, 2019

(65) Prior Publication Data

US 2021/0063540 A1     Mar. 4, 2021

(51) Int. Cl.
*G01S 7/481*     (2006.01)

(52) U.S. Cl.
CPC .................................. *G01S 7/4813* (2013.01)

(58) Field of Classification Search
CPC ................ G01S 7/4813; G05D 1/0231; G05D 2201/0213
See application file for complete search history.

(56) References Cited

U.S. PATENT DOCUMENTS

| 10,144,394 | B1 | 12/2018 | Rice |
| 2016/0176384 | A1* | 6/2016 | Dissette .................. G01S 7/02 134/34 |
| 2018/0290631 | A1 | 10/2018 | Rice et al. |
| 2019/0003895 | A1 | 1/2019 | Krishnan et al. |
| 2019/0009752 | A1 | 1/2019 | Rice et al. |
| 2019/0077376 | A1* | 3/2019 | Baldovino ............... B60S 1/52 |
| 2019/0184942 | A1* | 6/2019 | Vaishnav ................. B08B 1/04 |
| 2019/0235054 | A1* | 8/2019 | Ratner ..................... G01S 17/42 |
| 2020/0159010 | A1* | 5/2020 | Kuwae ..................... B08B 5/02 |
| 2020/0174100 | A1* | 6/2020 | Hori ........................ F21S 45/47 |

* cited by examiner

*Primary Examiner* — Dale W Hilgendorf
*Assistant Examiner* — Frank T Glenn, III
(74) *Attorney, Agent, or Firm* — Frank A. MacKenzie; Bejin Bieneman PLC (57) ABSTRACT

A sensor assembly includes a housing having a front chamber and a rear chamber fluidly isolated from the front chamber. The rear chamber includes a rear sensor window and the front chamber includes a front sensor window. The rear chamber includes a rear air inlet and a rear air outlet. The rear air outlet is aimed at the rear sensor window. The front chamber includes a front air inlet and a front air outlet. The front air inlet is aimed at the front sensor window.

17 Claims, 6 Drawing Sheets

SENSOR ASSEMBLY FOR AUTONOMOUS VEHICLE

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

A sensor assembly including a housing having a front chamber and a rear chamber fluidly isolated from the front chamber, the rear chamber including a rear sensor window, the front chamber including a front sensor window, the rear chamber including a rear air inlet and a rear air outlet, the rear air outlet aimed at the rear sensor window, and the front chamber including a front air inlet and a front air outlet, the front air outlet aimed at the front sensor window.

The front air inlet and the front air outlet may face a vehicle-forward direction.

The sensor assembly may include a blower in the front chamber.

The front sensor window may face the vehicle-forward direction.

The front air inlet and the front air outlet may be positioned to neutralize a stagnation pressure external to the housing at the front sensor window.

The sensor assembly may include a blower in the front chamber.

The sensor assembly may include a blower in the rear chamber.

The rear chamber may include a main chamber, a side chamber, and an interior wall between the main chamber and the side chamber and a blower extending through the interior wall, the interior wall and the blower completely separating the main chamber and the side chamber.

The sensor assembly may include an image sensor having a field of view through the front sensor window and having cooling fins in the front chamber.

The front air inlet, front air outlet, rear air inlet and rear air outlet may be open to an external environment.

The sensor assembly may include an upper chamber and a LIDAR sensor above the upper chamber, the upper chamber including another air outlet aimed at the LIDAR sensor.

The sensor assembly may include a blower between the rear chamber and the upper chamber.

A sensor assembly including a housing defining a first chamber and a second chamber, the first chamber including an air inlet and the second chamber including an air outlet, an interior wall between the first chamber and the second chamber, a blower extending through the interior wall, the interior wall and the blower completely separating the first chamber and the second chamber, and an image sensor in the second chamber.

The second chamber may include a sensor window and the air outlet is aimed at the sensor window.

The image sensor may have cooling fins in the second chamber.

The sensor assembly may include a third chamber having an air outlet, a second interior wall between the first chamber and the third chamber, and a second blower extending through the second interior wall, the second interior wall and the second blower completely separating the first chamber and the third chamber.

The third chamber may include a second sensor window and the air outlet of the third chamber is aimed at the second sensor window.

The sensor assembly may include a computer programmed to independently control the speed of the blower and the second blower.

The air inlet and the air outlet may be open to an external environment.

With reference to the Figures, wherein like numerals indicate like parts throughout the several views, a sensor assembly 10 for a vehicle 12 includes a housing 14 having a front chamber 16 and a rear chamber 18 fluidly isolated from the front chamber 16. The rear chamber 18 includes a rear sensor window 20 and the front chamber 16 includes a front sensor window 22. The rear chamber 18 includes a rear air inlet 24 and a rear air outlet 26. The rear air outlet 26 is aimed at the rear sensor window 20. The front chamber 16 includes a front air inlet 28 and a front air outlet 30. The front air inlet 28 is aimed at the front sensor window 22.

Air exiting the rear chamber 18 through the rear air outlet 26 creates an air curtain across the rear sensor window 20 and/or creates an air stream to clean the rear sensor window 20. Likewise, air exiting the front chamber 16 through the front air outlet 30 creates an air curtain across the front sensor window 22 and/or creates an air stream to clean the front sensor window 22. The rear chamber 18 and the front chamber 16 may be pressurized to force air to exit the rear air outlet 26 and the front air outlet 30, respectively. Since the rear chamber 18 and the front chamber 16 are fluidly isolated from each other, the rear chamber 18 and the front chamber 16 may be independently pressurized to independently control airflow at the rear air inlet 24 and the rear air outlet 26. This results in potential energy savings, e.g., resulting from being able to selectively increase pressure of only one of the chambers based on cleaning need and thus saving energy by not increasing pressure in the other. This also results in reduced noise/vibration/harshness (NVH), e.g., resulting from being able to selectively increase pressure of only one of the chambers based on cleaning need and thus reducing NVH by not increasing pressure in the other chamber.

As described below, the front air inlet 28 and the front air outlet 30 may face in the direction of travel of the vehicle 12. In such a case, during travel of the vehicle 12, the travel of the housing 14 through air results in a stagnation pressure in front of the housing 14. The front air inlet 28 and the front air outlet 30 face forward, i.e., face in a common direction, which results in ram air being forced into the front air inlet 28. This neutralizes the pressure difference between the exterior of the housing 14 at the front air inlet 28 and the front chamber 16 resulting in less additional pressurization (e.g., by blowers, etc.) necessary to exit air from the front air outlet 30. The ram air is proportional to the speed of the vehicle 12. In the even the stagnation pressure is not entirely neutralized due to the effect of ram air into the front air inlet 28, the front chamber 16 may be pressurized to an increase pressure to overcome the stagnation pressure and this increase is independent of the pressure of the rear chamber 18, as described above.

Figure 1:
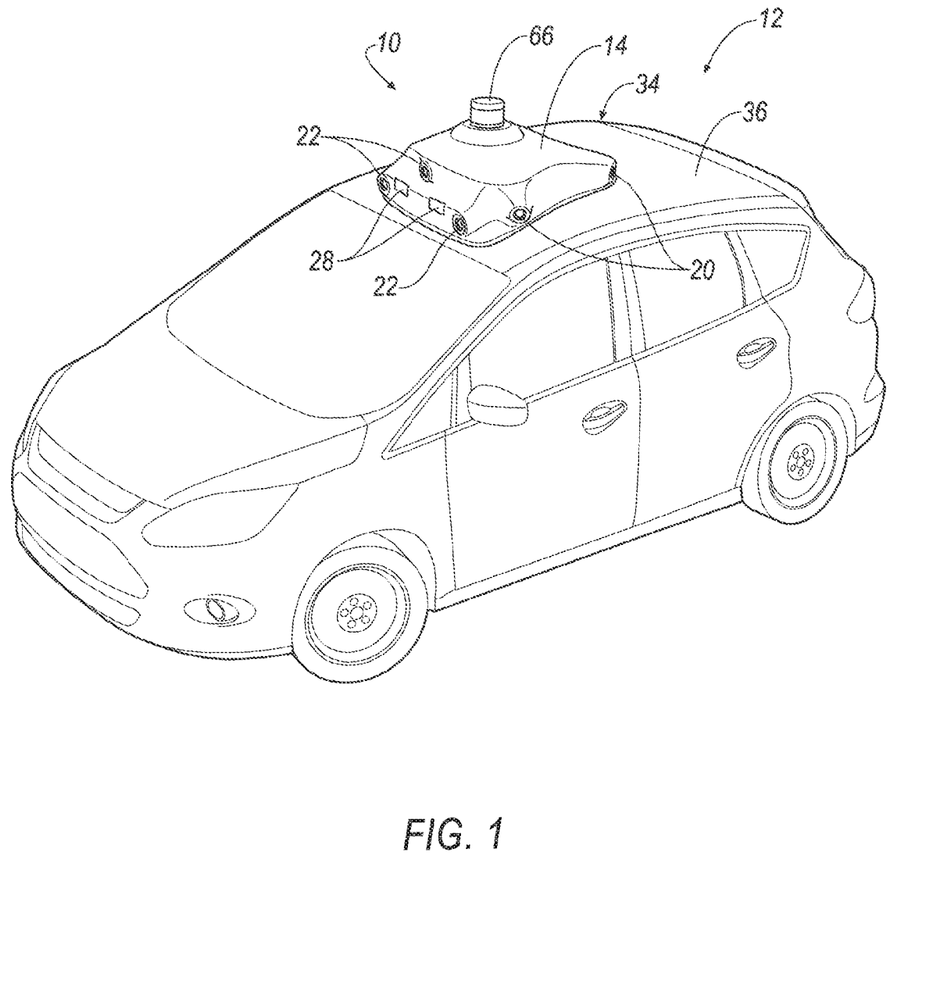
FIG. 1 is a prospective view of a vehicle including sensor assembly on a roof of the vehicle.

With reference to FIG. 1, the vehicle 12 may be any passenger or commercial automobile such as a car, a truck, a sport utility vehicle, a crossover, a van, a minivan, a taxi, a bus, etc. The vehicle 12 may be an autonomous vehicle. A computer 32 can be programmed to operate the vehicle 12 independently of the intervention of a human driver, completely or to a lesser degree. The computer 32 may be programmed to operate propulsion, brake system, steering, and/or other vehicle systems based at least in part on data received from sensors such as the image sensors and/or LIDAR sensor described below. For the purposes of this disclosure, autonomous operation means the computer 32 controls the propulsion, brake system, and steering without input from a human driver; semi-autonomous operation means the computer 32 controls one or two of the propulsion, brake system, and steering and a human driver controls the remainder; and nonautonomous operation means a human driver controls the propulsion, brake system, and steering.

The vehicle 12 includes a body 34. The body 34 may be of any suitable material, for example, steel, aluminum, etc. The body 34 includes body panels partially defining an exterior of the vehicle 12. The body panels may present a class-A surface, e.g., a finished surface exposed to view by a customer and free of unaesthetic blemishes and defects. The body panels include, e.g., a roof 36, etc.

With continued reference to FIG. 1, the sensor assembly 10 is supported on a component of the vehicle 12, e.g., the roof 36 of the vehicle 12. The housing 14 may be shaped to match the contour of the roof 36. The housing 14 may be plastic, metal, or combinations thereof. The housing 14 is sufficiently rigid to remain stationary relative to the rest of the vehicle 12, e.g., the roof 36, and to withstand force from external airflow and wind during movement of the vehicle 12.

Figure 2:
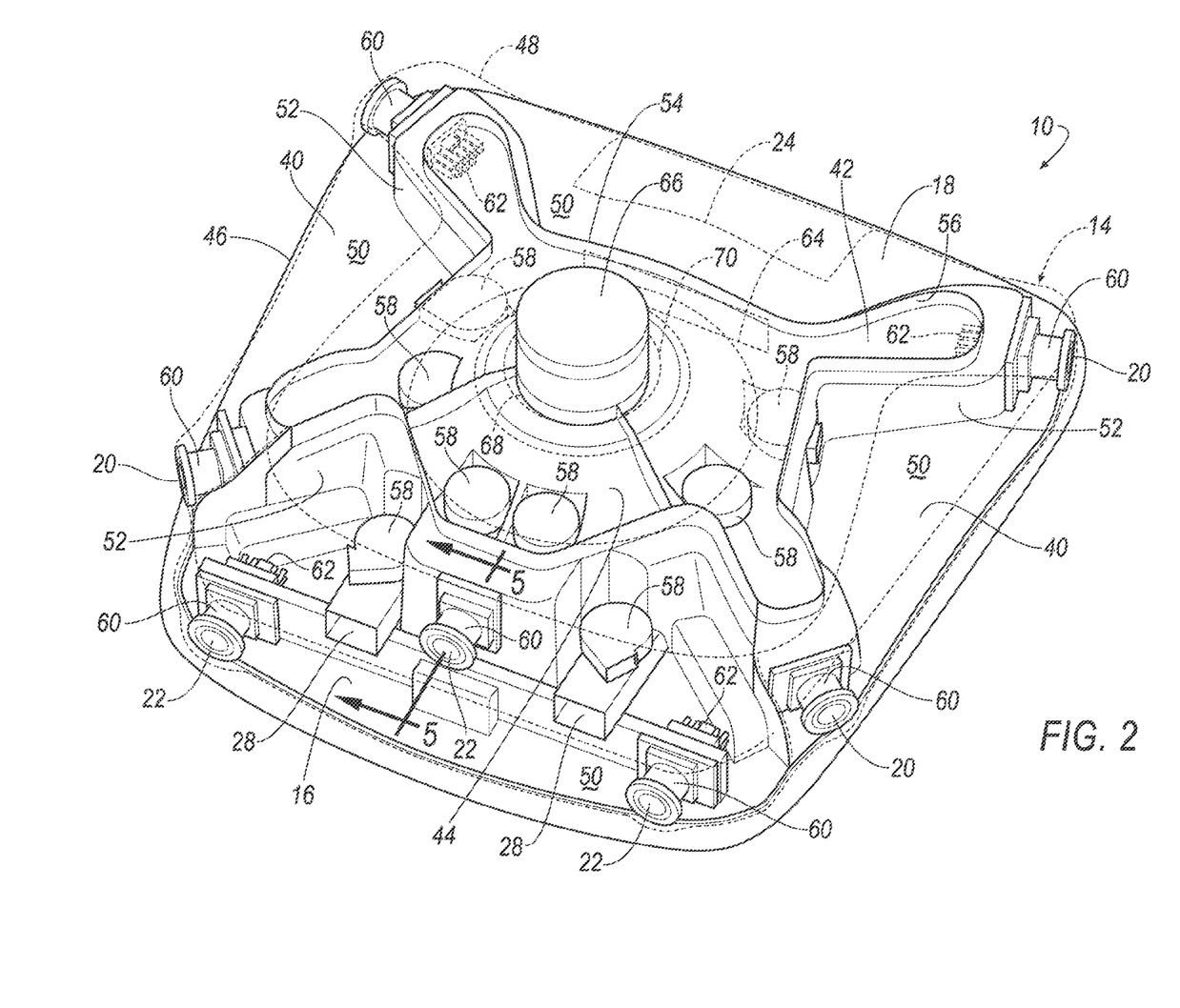
FIG. 2 is a perspective view of the sensor assembly with including a base and a cover on the base, the cover being shown in hidden lines to show a front chamber and a rear chamber.
Figure 3:
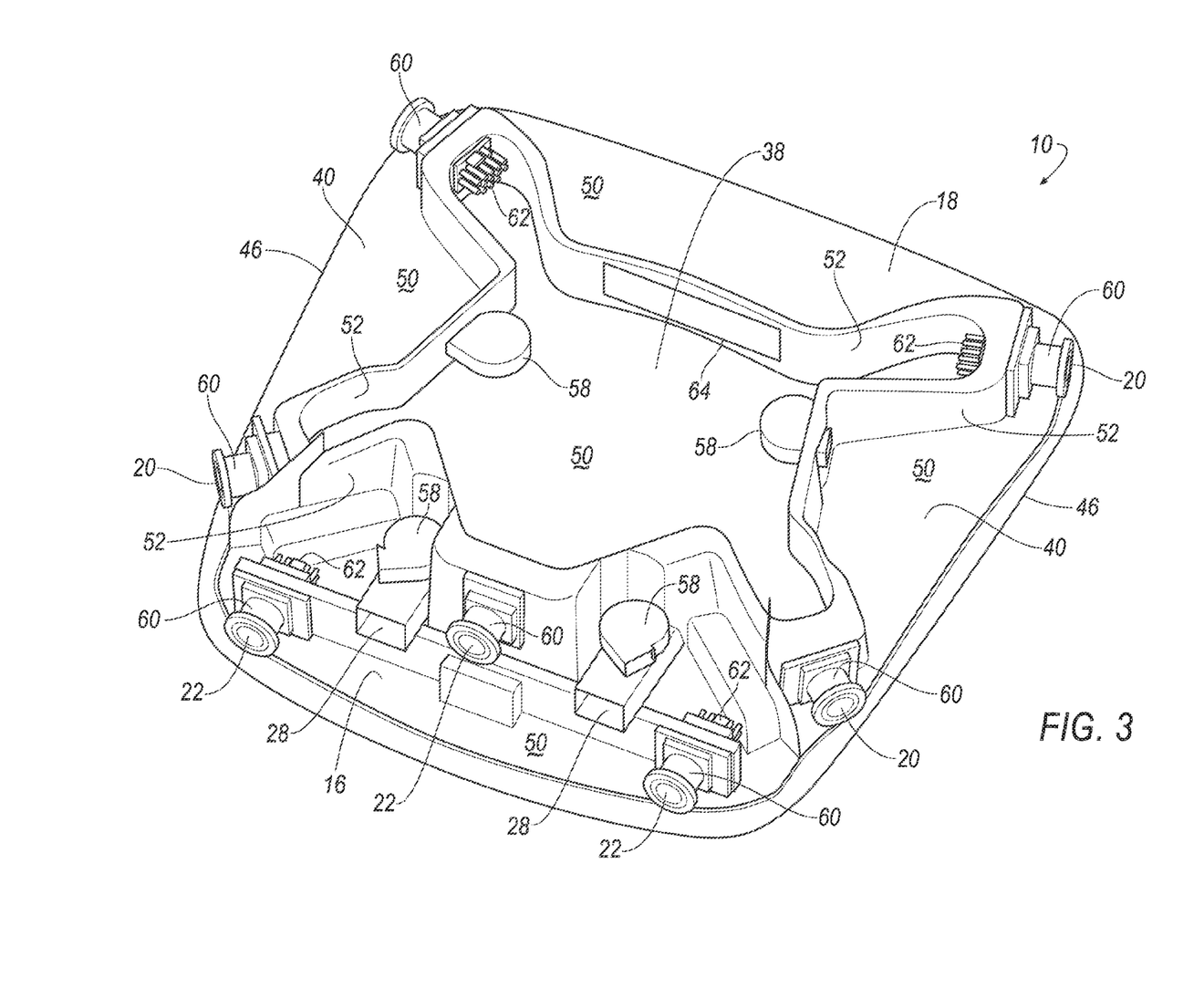
FIG. 3 is a perspective view of the base of the sensor assembly with a tray and Lidar sensor removed to show a main chamber of the rear chamber.
Figure 4:
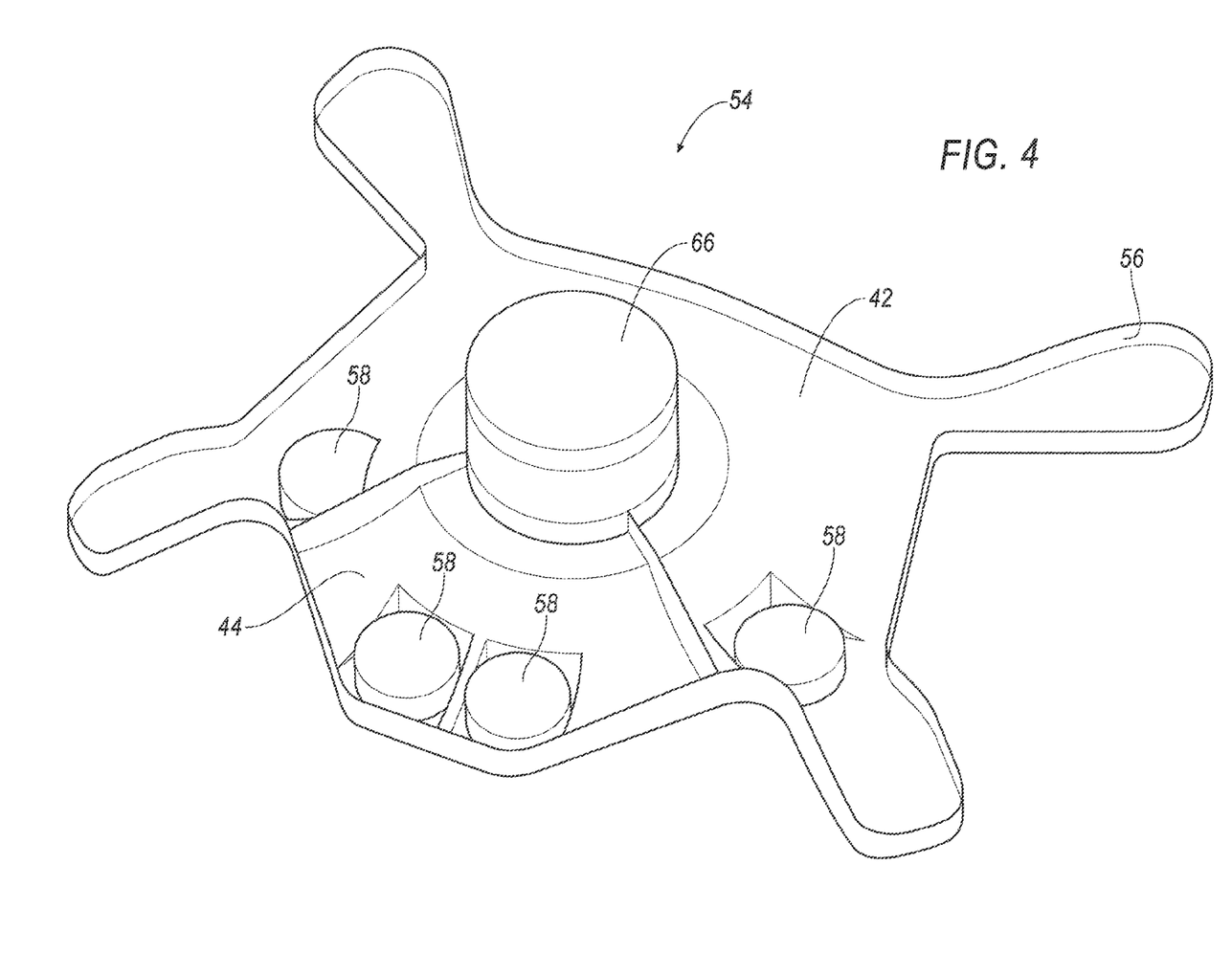
FIG. 4 is a perspective view of the tray and the Lidar sensor in isolation.

With reference to FIGS. 2-4, the housing 14 includes a plurality of chambers including the front chamber 16 and the rear chamber 18. The front chamber 16 is vehicle-forward of the rear chamber 18. The front chamber 16 may be the forward-most chamber of the housing 14. The rearward chamber is vehicle-rearward of the front chamber 16. The rearward chamber may be the rearward-most chamber of the housing 14. In the example shown in the Figures, no chambers are between the front chamber 16 and the rearward chamber, and in other examples, one or more additional chamber may be between the front chamber 16 and the rearward chamber.

The rear chamber 18 may be segmented into separate chambers, e.g., a main chamber 38 (FIG. 3), two side chambers 40 (FIGS. 2 and 3), an upper-rearward chamber 42 (FIG. 4), and an upper-forward chamber 44 (FIG. 4). As described below, the front chamber 16, the side chambers 40, the upper-rearward chamber 42, and upper-forward chamber 44 are fluidly isolated from each other.

With continued reference to FIGS. 2-4, the housing 14 may include a base 46 and a cover 48 supported by the base 46. The base 46 may include a floor 50 and interior walls 52 extending upwardly from the floor 50. The interior walls 52 surround the main chamber 38, i.e., continuously. The floor 50 in the front chamber 16, the main chamber 38, and the side chambers 40 may be one continuous element onto which the walls 52 are fixed or may be four separate elements extending from the walls.

The cover 48 may abut the floor 50, e.g., around the periphery of the floor 50, and may abut the walls 52 to enclose and separate the chambers. With reference to FIG. 2, the cover 48 abuts the walls 52 to enclose the front chamber 16 between the floor 50, the walls, and the cover 48; and the cover 48 abuts the walls 52 to enclose the side chamber 40 between the floor 50, the walls, and the cover 48.

With continued reference to FIGS. 2-4, the base 46 may include a tray 54 enclosing and separating the main chamber 38 from the upper-rearward chamber 42 and the upper-forward chamber 44. Specifically, a bottom of the tray 54 abuts the walls 52 to enclose the main chamber 38 between the floor 50, the walls, and the bottom of the tray 54. The cover 48 abuts sides 56 of the tray 54 to enclose the upper-rearward chamber 42 between the bottom of the tray 54, the side of the tray 54, and the cover 48. The cover 48 abuts the sides 56 of the tray 54 to enclose the upper-forward chamber 44 between the bottom of the tray 54, the sides 56 of the tray 54, and the cover 48.

The sensor assembly 10 includes a plurality of blowers 58 for selectively pressurizing the front chamber 16, the side chambers 40, the upper-forward chamber 44, and the upper-rearward chamber 42. The blowers 58 may be of any suitable type. As one example, one or more of the blowers 58 may be impeller driven. As another example, one or more of the blowers 58 may be a fan. The blowers 58 may be one-way blowers 58, i.e., may blow air from the main chamber 38 to the side chambers 40, the upper-rearward chamber 42, and the upper-forward chamber 44 without allowing air to move from the side chambers 40, the upper-rearward chamber 42, or the upper-forward chamber 44 to the main chamber 38.

The blowers 58 may selectively move air from the main chamber 38 to the side chambers 40, the upper-rearward chamber 42, and the upper-forward chamber 44. The blowers 58 pressurize the side chambers 40, the upper-rearward chamber 42, and the upper-forward chamber 44 with air from the main chamber 38. The blowers 58 from the main chamber 38 to the upper-rearward chamber 42 and the upper-forward chamber 44 extend through the tray 54, as shown in FIGS. 2 and 4. The blowers 58 from the main chamber 38 the side chambers 40 extend through the wall, as shown in FIG. 3. The sensor assembly 10 may include one or more blowers 58 in the front chamber 16 for pressurizing air in the front chamber 16, as described further below.

The rear chamber 18 and the front chamber 16 are fluidly isolated from one another. In other words, no fluid is able to flow from the rear chamber 18 to the front chamber 16 or from the front chamber 16 to the rear chamber 18. The interior wall 52 between the front chamber 16 and the rear chamber 18 fluidly isolates the front chamber 16 and the rear chamber 18 from each other. No blowers 58 extend through the wall 52 between the front chamber 16 and the rear chamber 18.

As set forth above, the front chamber 16, the side chambers 40, and the upper chamber are fluidly isolated from one another. In other words, no fluid is able to flow from any one of the front chamber 16, the side chambers 40, and the upper chamber to any one of the other of the front chamber 16, the side chambers 40, and the upper chamber.

The side chambers 40, the upper-forward chamber 44, and the upper-rearward chamber 42 may be completely separated from the main chamber 38. In other words, air does not freely move from the main chamber 38 to the side chambers 40, the upper-forward chamber 44, and the upper-rearward chamber 42 without being forced by the blowers 58. The interior walls 52 and the tray 54 are impervious to air flow and the only path of air communication from the main chamber 38 to the side chambers 40, the upper-forward chamber 44, and the upper-rearward chamber 42 is through the blowers 58. As set forth above, the blowers 58 may prevent air flow from the side chambers 40, the upper-forward chamber 44, and the upper-rearward chamber 42 when the blowers 58 are not operational.

The sensor assembly 10 includes a plurality of sensor windows 20, 22. In the example shown in the Figures, the sensor windows 20, 22 are at the front chamber 16, and the side chambers 40. The sensor windows 20, 22 may face in any suitable direction.

The sensor assembly 10 includes an image sensor 60 at each sensor window 20, 22. The image sensor 60 may include a field of view through the respective sensor window 20, 22 in the front chamber 16. Specifically, the sensor window 20, 22 permits light to pass therethrough and the image sensor 60 is positioned to sense the light passing through the sensor window 20, 22. The sensor window 20, 22 may be the glass of the image sensor 60 or glass adjacent the image sensor 60.

The image sensors 60 may detect the external world, e.g., objects and/or characteristics of surroundings of the vehicle 12, such as other vehicles, road lane markings, traffic lights and/or signs, pedestrians, etc. For example, the sensors may include radar sensors, scanning laser range finders, light detection and ranging (LIDAR) devices, and image processing sensors such as cameras. The sensors may include communications devices, for example, vehicle-to-infrastructure (V2I) or vehicle-to-vehicle (V2V) devices.

The image sensor 60 may include cooling fins 62. The cooling fins 62 may be in the main chamber 38 for cooling by moving air in the main chamber 38. The image sensor 60 may extend through the interior wall 52 so that the cooling fins 62 are positioned in the main chamber 38. For example, with reference to FIG. 2, the cooling fins 62 at the side chambers 40 extend through the wall 52 to the main chamber 38 and one cooling fin at the front chamber 16 extends through the interior wall 52 to the main chamber 38. With continued reference to FIG. 2, two of the image sensors 60 in the front chamber 16 have cooling fins 62 in the front chamber 16, i.e., are cooled by moving air in the front chamber 16. The cooling fins 62 have a relatively high thermal conductivity. For example, the fins may be aluminum or any other suitable material.

Figure 5:
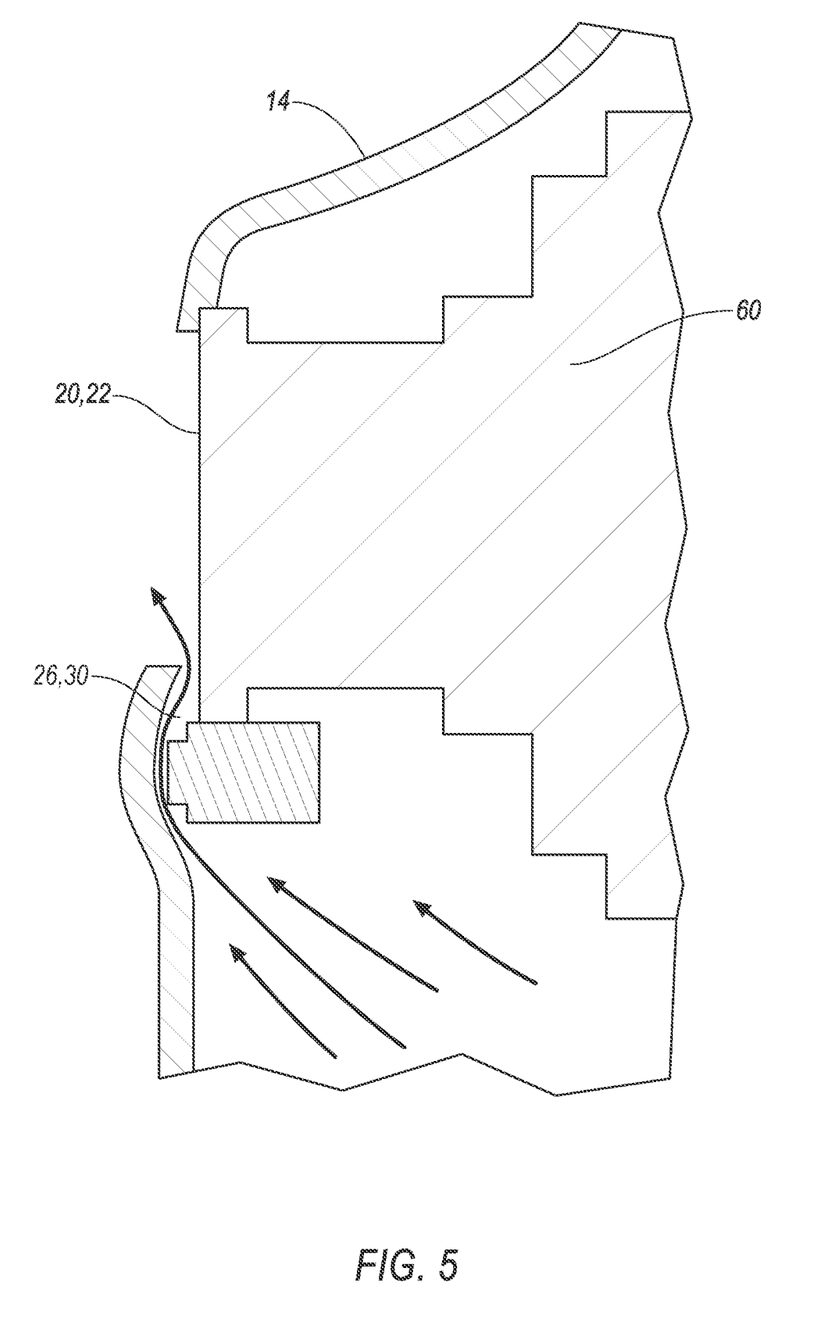
FIG. 5 is a cross-section through line 5 in FIG. 2 showing an image sensor and an aimed at the image sensor.

The sensor assembly 10 includes air outlets 26, 30 at each image sensor 60. With reference to FIG. 5, the air outlets 26, 30 are aimed at the respective sensor window 20, 22. In one example, the air from the air outlet 26, 30 may flow across the sensor window 20, 22 to act as a curtain and prevent debris from blocking the field of view of the image sensor 60 through the front sensor window 22. In another example, the air expelled from the air outlet 26, 30 may be directed at the sensor window 20, 22. Debris on or near the sensor window 20, 22 may be removed from the sensor window 20, 22 by the air from the front air outlet 30. In another example, the air from the air outlet 26, 30 may defog or defrost the front sensor window 22. The air outlet 26, 30 shown in FIG. 5 may be identical to the air outlet 26, 30 at each image sensor 60 shown in the Figures.

With reference to FIGS. 2 and 4, the sensor assembly 10 includes at least one front air inlet 28. The front air inlet 28 is open to the external environment. In the example shown in the Figures, the sensor assembly 10 includes two front air inlets 28. The front air inlet 28 supplies air to the front chamber 16. For example, the front air inlet 28 may face the vehicle-forward direction. In such an example, ram air is forced into the front air inlets 28 as the vehicle 12 moves forward. As set forth above, the sensor assembly 10 may include blowers 58 at the front air inlet 28 for additional draw of air from the exterior into the front chamber 16. The ram air and/or the blowers 58 pressurize the front chamber 16.

As set forth above, the front air inlet 28 and the front air outlet 30 are positioned to neutralize the pressure difference between a stagnation pressure external to the front chamber 16 and the pressure in the front chamber 16 during forward movement of the vehicle 12. During forward movement of the vehicle 12, ram air enters the front chamber 16 through the front air inlet 28 (i.e., air forced into the front air inlet 28 by forward movement of the vehicle 12) increasing the pressure inside the front chamber 16. The pressure inside the chamber may be further increased by the blower 58 at the air inlet 28. The ram air, and optionally the air intake by the blower 58, both lowers the pressure external to the front chamber 16 and increases the pressure in the front chamber 16. Thus, less pressure needs to be generated, i.e., by the blower 58, in order to expel air from the front air outlet 30 to adequately clean, defrost, defog, etc., the sensor window 20, 22.

With reference to FIGS. 2 and 3, the housing 14 includes an air intake 64 to intake air that is pressurized and expelled through the rear air outlets 26. The air intake 64 is in fluid communication with the main chamber 38. Specifically, the air intake 64 may extend through the interior wall 52 of the housing 14 from the exterior to the main chamber 38. The air intake 64 may, for example, open to the exterior in a vehicle-rearward direction. The air intake 64 may include a filter for filtering dust, water droplets, etc., from entering the main chamber 38.

As set forth above, the blowers 58 in main chamber 38 draw air from main chamber 38 and pressurize the air in the side chambers 40, the upper-rearward chamber 42, and the upper-forward chamber 44. The blowers 58 are independently operable so that either of the side chambers 40, the upper-rear chamber 18, and the upper-forward chamber 44 may be independently pressurized to different pressures to independently control the air output through the rear air outlets 26, a front LIDAR-cleaning slot 68 (described further below), and a rear LIDAR-cleaning slot 70 (described further below).

Specifically, the blowers 58 between the main chamber 38 and the side chambers 40 are powered to pressurize the air in the side chambers 40 to control air output through the rear air outlets 26 at the side chambers 40. The pressure in the side chamber 40 may be proportional to the speed of the blowers 58, i.e., the pressure in the side chamber 40 increases as the speed of the blowers 58 to that side chamber 40 increases. Increased pressure in the side chamber 40 results in increased airflow through the rear air outlet 26. The blowers 58 are independently operable so that either of the side chambers 40 may be independently pressurized to different pressures to independently control the air output through the rear air outlets 26.

With reference to FIGS. 2 and 4, the sensor assembly 10 may include a LIDAR sensor 66 above the rear chamber 18. The LIDAR sensor 66 may be supported on the bottom of the tray 54. The LIDAR sensor 66 shown in the Figures is a scanning LIDAR sensor 66. The LIDAR sensor 66 extends upwardly through the cover 48. In other words, the cover 48 has a hole and the LIDAR sensor 66 extends through the hole.

The cover 48 includes at least one air outlet aimed at the LIDAR sensor 66. For example, as set forth above, the cover 48 may include a front LIDAR-cleaning slot 68 in the upper-forward chamber 44 and a rear LIDAR-cleaning slot 70 in the upper-rearward chamber 42. The front LIDAR-cleaning slot 68 and the rear LIDAR-cleaning slot 70 are both aimed at the LIDAR sensor 66. The front LIDAR-cleaning slot 68 may extend 120 degrees around the LIDAR sensor 66 and the rear LIDAR-cleaning slot 70 may extend 240 degrees around the LIDAR sensor 66.

As set forth above, blowers 58 in main chamber 38 draw air from main chamber 38 and pressurize the air in the upper-rearward chamber 42 and the upper-forward chamber 44. The blowers 58 between the main chamber 38 and the upper-rearward chamber 42 and the upper-forward chamber 44 are powered pressurize the air in the upper-rearward chamber 42 and the upper-forward chamber 44 to control air output through the rear LIDAR-cleaning slot 70 and the front LIDAR-cleaning slot 68, respectively. In other words, airflow from the rear LIDAR-cleaning slot 70 and from the front LIDAR-cleaning slot 68 can be independently controlled. This can accommodate vehicle 12 speed and direction, wind speed and direction, etc.

As set forth above, the blowers 58 are independently operable to independently pressurize the chambers. Specifically, the sensor assembly 10 may have a computer 32 programmed to independently control the speed of the blowers 58. The speed of each blower 58 may be based on vehicle 12 speed and direction, wind speed and direction, detection of an obstruction on the sensor window 20, 22 or LIDAR sensor 66, detection of airborne material such as dust, precipitation, etc.; and the computer 32 may be programmed to receive inputs indicating this information from sensors, computers, control modules, etc., of the vehicle 12. "Based on" and "in response to" are used herein to refer to causal relationships, not merely temporal relationships.

Figure 6:
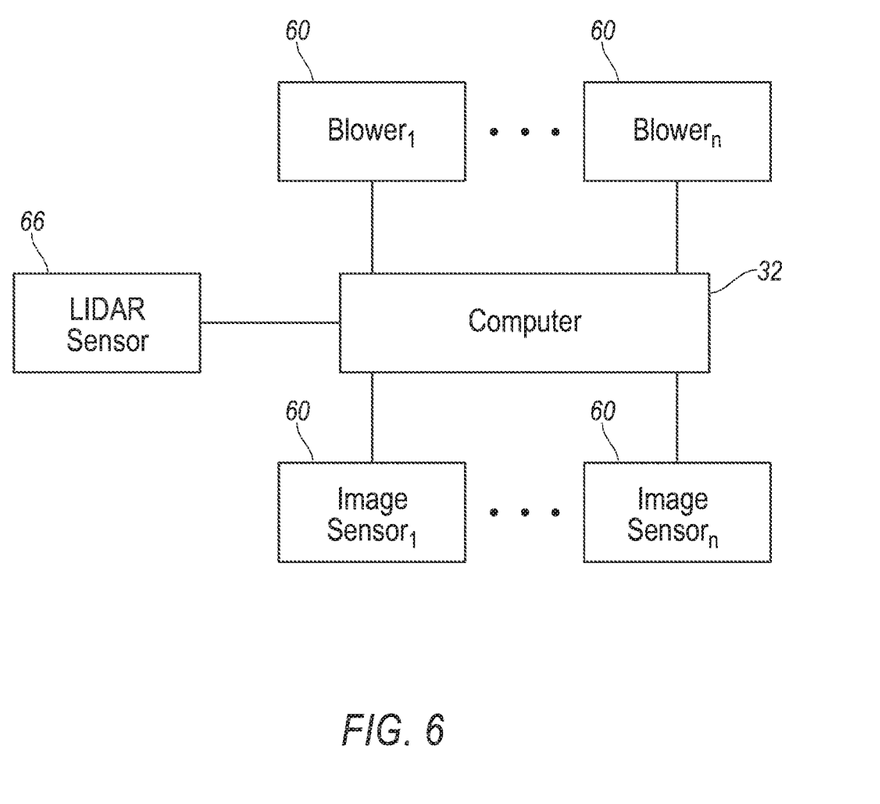
FIG. 6 is a schematic of components of the sensor assembly.

The computer 32, as shown in FIG. 6, includes a processor and a memory such as are known. The memory includes one or more forms of computer readable media, and stores instructions executable by the processor for performing various operations, including as disclosed herein. The computer 32 may include programming to operate one or more of vehicle 12 brakes, propulsion (e.g., control of acceleration in the vehicle 12 by controlling one or more of an internal combustion engine, electric motor, hybrid engine, etc.), steering, climate control, interior and/or exterior lights, etc., as well as to determine whether and when the computer 32, as opposed to a human operator, is to control such operations. Additionally, the computer 32 may be programmed to determine whether and when a human operator is to control such operations.

With continued reference to FIG. 6, the computer 32 may include or be communicatively coupled to, e.g., via a vehicle network such as a communications bus as described further below, more than one processor, e.g., included in components such as sensors, electronic controller units (ECUs) or the like included in the vehicle 12 for monitoring and/or controlling various vehicle components, e.g., a powertrain controller, a brake controller, a steering controller, etc. The computer 32 is generally arranged for communications on a vehicle communication network that can include a bus in the vehicle 12 such as a controller area network (CAN) or the like, and/or other wired and/or wireless mechanisms.

Via the vehicle network, the computer 32 may transmit messages to various devices in the vehicle 12 and/or receive messages (e.g., CAN messages) from the various devices, e.g., sensors, an actuator, a human machine interface (HMI), etc. Alternatively or additionally, in cases where the computer 32 actually comprises a plurality of devices, the vehicle communication network may be used for communications between devices represented as the computer 32 in this disclosure. Further, as mentioned below, various controllers and/or sensors may provide data to the computer 32 via the vehicle communication network.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
a sensor housing having a front chamber and a rear chamber fluidly isolated from the front chamber;
the rear chamber including a rear sensor window;
the front chamber including a front sensor window;
the rear chamber including a rear air inlet and a rear air outlet, the rear air outlet aimed at the rear sensor window;
the front chamber including a front air inlet and a front air outlet, the front air outlet aimed at the front sensor window;
the rear chamber including a main chamber, a side chamber, and an interior wall between the main chamber and the side chamber; and
a blower extending through the interior wall, the interior wall and the blower fluidly isolating the main chamber and the side chamber when the blower is not operational, and the blower forcing air from the main chamber to the side chamber when the blower is operational.

2. The sensor assembly of claim 1, wherein the front air inlet and the front air outlet face a vehicle-forward direction.

3. The sensor assembly of claim 2, further comprising a blower in the front chamber.

4. The sensor assembly of claim 2, wherein the front sensor window faces the vehicle-forward direction.

5. The sensor assembly of claim 4, wherein the front air inlet and the front air outlet are positioned to neutralize a stagnation pressure external to the housing at the front sensor window.

6. The sensor assembly of claim 1, further comprising a blower in the front chamber.

7. The sensor assembly of claim 1, further comprising an image sensor having a field of view through the front sensor window and having cooling fins in the front chamber.

8. The sensor assembly of claim 1, wherein the front air inlet, front air outlet, rear air inlet and rear air outlet are open to an external environment.

9. The sensor assembly of claim 1, further comprising an upper chamber and a LIDAR sensor above the upper chamber, the upper chamber including another air outlet aimed at the LIDAR sensor.

10. The sensor assembly of claim 9, further comprising a blower between the rear chamber and the upper chamber.

11. A sensor assembly comprising:
   a sensor housing defining a first chamber and a second chamber, the first chamber including an air inlet and the second chamber including an air outlet;
   an interior wall between the first chamber and the second chamber;
   a blower extending through the interior wall, the interior wall and the blower fluidly isolating the first chamber and the second chamber when the blower is not operational, and the blower forcing air from the first chamber to the second chamber when the blower is operational; and
   an image sensor in the second chamber.

12. The sensor assembly of claim 11, wherein the second chamber includes a sensor window and the air outlet is aimed at the sensor window.

13. The sensor assembly of claim 12, wherein the image sensor has cooling fins in the second chamber.

14. The sensor assembly of claim 11, further comprising a third chamber having an air outlet, a second interior wall between the first chamber and the third chamber, and a second blower extending through the second interior wall, the second interior wall and the second blower fluidly isolating the first chamber and the third chamber when the second blower is not operational.

15. The sensor assembly of claim 14, wherein the third chamber includes a second sensor window and the air outlet of the third chamber is aimed at the second sensor window.

16. The sensor assembly of claim 14, further comprising a computer programmed to independently control the speed of the blower and the second blower.

17. The sensor assembly of claim 11, wherein the air inlet and the air outlet are open to an external environment.

\* \* \* \* \*